Patented Oct. 18, 1932

1,883,525

UNITED STATES PATENT OFFICE

WALTER BRUCK, OF MANNHEIM, GERMANY, ASSIGNOR TO I. G. FARBENINDUSTRIE AKTIENGESELLSCHAFT, OF FRANKFORT-ON-THE-MAIN, GERMANY

CHLORO-ANTHRAQUINONE-ACRIDONES AND PROCESS OF MAKING SAME

No Drawing. Application filed August 13, 1930, Serial No. 475,120, and in Germany August 17, 1929.

The present invention relates to the production of chloro-anthraquinone-2.1(N)-benzacridones.

I have found that particularly valuable chloro - anthraquinone-2.1(N)-benzacridones are obtained by treating 1-anilino-anthraquinones which contain a methyl group in the ortho position to the nitrogen atom or such derivatives thereof as contain chlorine or only substituents which are replaced by chlorine, such as nitro groups, sulpho groups and bromine, with chlorine or agents supplying chlorine, such as sulphuryl chloride, in an inert organic solvent and in the absence of agents for combining with hydrochloric acid and preferably in the absence of water, until products are formed which yield chloro-anthraquinone-acridones containing more than 5, preferably 6, atoms of chlorine when saponified. These products are obtained, for example, when the chlorination is carried out, preferably at temperatures above 170° C., as rapidly as possible, which may be effected by introducing chlorine through a large number of inlet nozzles into the reaction mixture.

The resulting products are usually orange colored, and, with a suitable concentration, separate from the hot reaction mixture in the form of crystals on cooling. They consist of from penta- to hexa-chloro substitution products of anthraquinone-acridoneketochloride (I) or of anthraquinonechloroacridene (II) probably having the following constitutions:

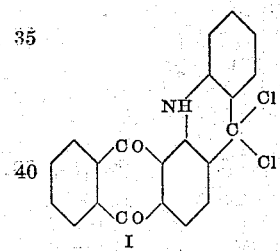   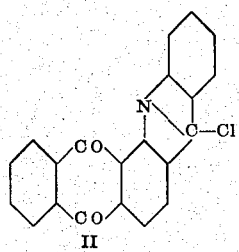
  I                II

With saponifying agents these products may be readily converted into the corresponding chloro-anthraquinone-acridones which are valuable red vat dyestuffs and which, as regards their tinctorial properties, are superior to the products obtainable according to the U. S. Patent No. 1,133,081. Saponification may be effected according to known methods, for example, by dissolving the chlorination products in concentrated sulphuric acid or by heating them with water or steam.

Practically the same anthraquinone-2.1(N)-benzacridones containing more than five, preferably six, atoms of chlorine are obtained by causing agents which are capable of replacing oxygen by chlorine, as, for example, phosphorus pentachloride or thionyl chloride, to act on anthraquinone-2.1(N)-benzacridone or such derivative thereof as contains chlorine or such substituents as are eliminated by chlorine, preferably in an inert organic solvent or suspending agent, as for example trichlorobenzene, the reaction products obtained being then chlorinated by means of chlorine or agents replacing hydrogen by chlorine, such as sulphuryl chloride. In this manner the anthraquinone-2.1(N)-benzacridones are first converted, for example by the action of phosporus pentachloride, into comparatively readily soluble compounds and these, according to the reaction conditions during the chlorination, are then converted into the dystuffs containing five to six atoms of chlorine, which are usually difficultly soluble, or into readily soluble intermediate products from which, if necessary after separation of the difficultly soluble products, equally valuable chloro-anthraquinone-2.1(N)-benzacridones, in part having especially pure shades of color, may be obtained by splitting off chlorine or hydrogen chloride, as for example by means of reducing agents such as phenol. The aforesaid difficultly soluble reaction products are preferentially formed, if the chlorination is carried out at more elevated temperatures.

The anthraquinone-2.1(N)-benzacridones containing more than five atoms of chlorine obtained in the beforedescribed manner are distinguished by the fact that they yield, when treated with diethylaniline, products dyeing brown to currant shades. This is in particular the case with the hexachloro derivative.

Dyestuffs which are distinguished by a purity of shade hitherto unknown in the anthraquinone-acridones series and which in the field of vat dyestuffs was hitherto only attained by the dyestuffs of the thioindigo class, are obtained by treating the anthraquinone - 2.1(N) - benzacridones containing more than five atoms of chlorine and preferably six atoms of chlorine with reducing agents, such as for example stannous chloride, in an organic solvent, for example phenol and trichlorobenzene. The same result is also obtained by converting the highly chlorinated products into their leuco compounds in the vat at about 55° C. and reconverting the leuco compounds into the dyestuffs by oxidation by means of air, or more quickly by means of a solution of an alkali metal hypochlorite. By the reduction in the beforedescribed manner the hexachloro derivatives give off one atom of chlorine and the hexachloro derivatives dyeing blue red shades are converted into pentachloro derivatives dyeing pure pink shades. The same shades are also obtained, when dyeing the hexachloro derivatives from the vat at about 55° C.

Since the leuco compound obtained from the hexachloro-anthraquinone-2.1(N)-benzacridone is difficultly soluble and precipitated from the vat, it is possible to separate it from the leuco compounds of the anthraquinoneacridones containing less chlorine, which are more readily soluble. It is thus possible to separate the dyestuff dyeing the purest shades from the mixture of dyestuffs obtained, when by the chlorination a uniform hexachloro derivative has not been obtained. In order to further the solubility of the pentachloro derivative in the vat, it is advantageous to treat it with potassium bichromate in dilute sulphuric acid.

The following examples will further illustrate the nature of this invention, but the invention is not restricted to these examples. The parts are by weight.

*Example 1*

125 parts of 1-anilido-2-methylanthraquinone are heated to boiling with about 900 parts of trichlorobenzene until the last traces of water have been removed. The whole is then allowed to cool to 175° C. and chlorine is led in during the course of about 6 hours until from a cooled sample of the reaction mixture a product separates which on saponification yields a hexachloro-anthraquinoneacridone. The reaction takes place with the evolution of heat so that the temperature rises to from 185° to 190° C.

When the chlorination is completed, the reaction mixture is gradually heated during the course of about 4 hours to 214° C. and is kept at this temperature for about 2 hours. By this time the evolution of hydrochloric acid has practically ceased. The reaction mixture is allowed to cool, and the melt which has solidified to a crystal pulp is filtered by suction and washed with trichlorobenzene. Under the microscope the resulting product is seen to be in the form of long orange yellow prisms. The product dissolves in hot nitrobenzene giving an orange yellow coloration. By its chlorine content it is obviously a hexachloro-anthraquinone-chloro-acridene.

The saponification into the anthraquinone-acridone vat dyestuff takes place when the product is dissolved in concentrated sulphuric acid and also when the product is heated for a long time with water. If the isolated reaction product, therefore, be subjected to a steam distillation, preferably with the addition of sodium carbonate, the conversion into the anthraquinone-acridone vat dyestuff takes place. It is dried and brought into a form suitable for dyeing by dissolving it in concentrated sulphuric acid and reprecipitating it with water. By analysis the product corresponds to a hexachloro-anthraquinone-acridone probably of the formula:

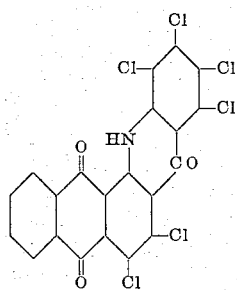

It may be recrystallized from trichlorobenzene and furnishes, when boiled for one hour with diethylaniline, a dyestuff dyeing currant shades. It dissolves in concentrated sulphuric acid and in hot nitrobenzene giving a red coloration. An extremely brilliant fast red shade is obtained therewith on cotton from a violet vat heated to about 55° C.

In order to be able to obtain dyeings of equal purity with the dyestuff from a cold vat, it may be vatted, for example, in the following manner: 10 parts of the dyestuff together with 4000 parts of water, 25 parts of caustic soda of 40° Baumé strength and 15 parts of sodium hydrosulphite are heated during the course of half an hour to about 55° C. and the whole is kept at the same temperature for another half an hour. The dyestuff dissolves giving first a violet coloration.

Air is then blown into the vat until the dyestuff has been completely precipitated. It is then filtered off, washed until neutral and worked up in the usual manner.

Instead of blowing air through the vat, 40 parts of a solution of an alkali metal hypochlorite may be added to the vat and the mixture stirred for about 1 hour at between 60° and 70° C.

*Example 2*

8 parts of the product obtainable in the manner described in Example 1, but in a shorter time than that stated in Example 1, which contains hexachloro-anthraquinone-2.1(N)-benzacridone besides acridones containing less chlorine and has an average content of chlorine of 37 per cent, are warmed in 2500 parts of water with 22 parts of a caustic soda solution of 40° Baumé and 14 parts of hydrosulphite during the course of half an hour to 50° C. and kept thereat for ¾ hour. The dyestuff first passes into solution, but soon part thereof separates out which is filtered off from the warm solution and washed with cold water until neutral. The reaction product, a pentachloro derivative according to analysis can be used for dyeing in the form in which it is obtained. It furnishes essentially purer shades than the initial material.

*Example 3*

75 parts of hexachloro-anthraquinone-2.1(N)-benzacridone obtainable according to Example 1 are dissolved in 750 parts of concentrated sulphuric acid whereupon the solution is poured onto ice. The separated dyestuff is filtered off, washed until free from acid and made into a fine paste according to known methods. The 10 per cent aqueous paste is warmed by introducing steam, while slowly stirring, during the course of about ¾ hour to 50° C. with 6000 parts of water, 150 parts of a caustic soda solution and 75 parts of hydrosulphite, the temperature being kept at the said height for a further ¾ hour. The brownish violet reaction product separated out is filtered off from the warm reaction mixture, taken up with water and stirred, while passing air through the aqueous suspension, until the coloration of the product has turned red. Thereupon the dyestuff is again filtered off and dried.

50 parts of the product thus obtained are dissolved in 500 parts of concentrated sulphuric acid whereupon the solution is introduced during 2 hours while vigorously stirring into a solution of 10 parts of potassium bichromate in 1500 parts of water, care being taken that the temperature does not rise above 35° C. The mixture is then warmed to 60° C. and again allowed to cool while stirring. The reaction product is filtered off, washed until neutral and made into a paste. It dyes stronger and purer shades than the product described in paragraph 4 of Example 1. It may be recrystallized from trichlorobenzene and is a pentachloro derivative according to analysis probably of the formula:

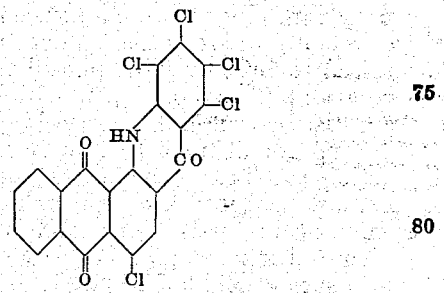

It dissolves in concentrated sulphuric acid to give an orange red solution. When boiling the product for one hour with diethylaniline, it loses about 1 atom of chlorine and is converted into a dyestuff dyeing orange yellow to brown shades, the product being reconverted into a pentachloro derivative by treating it in nitrobenzene with a chlorinating agent.

*Example 4*

15 parts of the chlorination product described in Example 1 in the form of a ten per cent aqueous paste are slowly stirred for about 20 hours while excluding air with about 1200 parts of water, 30 parts of a caustic soda solution of 40° Baumé and 15 parts of hydrosulphite. First a violet vat is obtained from which the reaction product soon begins to separate out. It is filtered off and washed with water until neutral. After it has been brought into a state of fine distribution by disintegration, it may be used for dyeing. The tinctorial properties of the product thus obtained are practically identical with those of the product obtained according to paragraph 4 of Example 1.

*Example 5*

10 parts of the chlorination product described in Example 1 are boiled for about 4 hours in 70 parts of trichlorobenzene with about 10 parts of stannous chloride. After cooling, the reaction product is filtered off, washed with trichlorobenzene and benzene and impurities are extracted by means of hydrochloric acid. The reaction product is brought into a state at fine distribution by dissolving it in concentrated sulphuric acid and precipitating by the addition of water. The product thus obtained dyes cotton from the cold vat shades of the same purity as the product described in paragraph 4 of Example 1.

*Example 6*

A mixture of 70 parts of the trichloro-anthraquinone-2.1(N)-benzacridone obtainable by treating anthraquinone-2.1(N)-benzacridone with sulphurylchloride in nitrobenzene in the presence of chloriodine, 380 of trichlorobenzene and 45 parts of phosphorus trichloride is slowly warmed to 150° C. while stirring under a reflux condenser. About 180 parts of chlorine are then passed into the reaction mixture in the course of 9 hours whereby the temperature is slowly raised to 190° C. The phosphorus oxychloride and phosphorus pentachloride formed are distilled off and the reaction mass is kept boiling for about 5 further hours. The reaction product separated on cooling, which is most probably hexachloro-anthraquinone-chloroacridene, is filtered off, washed with dichlorobenzene and freed from solvent and impurities soluble in alkalies by steam distillation after the addition of a solution of caustic soda. The reaction product thus obtained which is hexachloro-anthraquinone-2.1(N)-benzacridone, dissolves in concentrated sulphuric acid to give an orange red solution, and dyes cotton red shades of remarkable purity, in particular when the product is vatted while warming. The coloration of the vat is violet.

The dyestuff may also be revatted, preferably after it is brought into a state of fine distribution by reprecipitation from concentrated sulphuric acid, for example by heating to 55° C. during the course of about half an hour ten parts of the dyestuff with 4000 parts of water, 25 parts of caustic soda lye of 40° Baumé and 15 parts of hydrosulphite, the temperature being kept at the same height for a further half hour, whereupon the dyestuff is precipitated by blowing air through the vat. The product thus obtained dyes shades of excellent purity already from the cold vat. By recrystallization from dichlorobenzene the product is obtained in a state of purity suitable for analysis.

*Example 7*

125 parts of 1-anilino-2-methylanthraquinone are heated to 175° C. with about 900 parts of trichlorobenzene while passing a current of chlorine into the reaction mixture until a product is obtained which after saponification contains about 38 per cent of chlorine. The reaction mixture is then allowed to cool, the product filtered off and freed from adhering trichlorobenzene by a treatment with steam. The product is then dissolved in concentrated sulphuric acid and reprecipitated by the addition of water. 10 parts of the dyestuff thus obtained containing between 5 and 6 atomic proportions of chlorine per each molecular proportion of the dyestuff is then warmed to 55° C. during the course of ½ hour with 4000 parts of water, 25 parts of a caustic soda solution of 40° Baumé and 15 parts of sodium hydrosulphite and kept at the said temperature for another ½ hour. Air is then blown through the vat until the dyestuff is completely precipitated, which is then filtered off and washed until neutral. The dyestuff thus obtained contains between 4 and 5 atomic proportions of chlorine per each molecular proportion of the dyestuff and furnishes, when boiled with diethylaniline, a dyestuff containing less chlorine and dyeing cotton orange to brown shades in contradistinction to the dyestuff of the anthraquinone-benzacridone series containing from 4 to 5 atomic proportions of chlorine per each molecular proportion of the dyestuff obtainable according to the process described in the U. S. Patent No. 1,133,081 which on treatment with diethylaniline furnishes a product dyeing cotton from reddish currant to currant shades.

What I claim is:—

1. A process of producing chloro-anthraquinone-2.1(N)-benzacridones, which comprises treating an 1-anilinoanthraquinone containing a methyl group in ortho position to the nitrogen atom in an inert organic solvent in the absence of acid-binding agents with a chlorinating agent until products are produced which contain more than five atoms of chlorine when saponified.

2. A process of producing chloro-anthraquinone-2.1(N)-benzacridones, which comprises treating an 1-anilinoanthraquinone containing a methyl group in ortho position to the nitrogen atom in an inert organic solvent in the absence of acid-binding agents with a chlorinating agent until products are produced which contain more than five atoms of chlorine when saponified, and saponifying the products.

3. A process of producing chloro-anthraquinone-2.1(N)-benzacridones, which comprises treating an 1-anilinoanthraquinone containing a methyl group in ortho position to the nitrogen atom in an inert organic solvent in the absence of acid-binding agents with a chlorinating agent until products are produced which contain more than five atoms of chlorine when saponified, saponifying the products and treating them with a reducing agent.

4. A process of producing chloro-anthraquinone-2.1(N)-benzacridones, which comprises treating an 1-anilinoanthraquinone containing a methyl group in ortho position to the nitrogen atom in an inert organic solvent in the absence of acid-binding agents with a chlorinating agent until products are produced which contain more than five atoms of chlorine when saponified, saponifying the products, treating them with an alkaline solution of hydrosulphite and oxidizing the leuco compound thus prepared.

5. A process of producing chloro-anthraquinone-2.1(N)-benzacridones, which comprises treating an 1-anilinoanthraquinone containing a methyl group in ortho position to the nitrogen atom in an inert organic solvent in the absence of acid-binding agents with a chlorinating agent until products are produced which contain more than five atoms of chlorine when saponified, saponifying the products, treating them with an alkaline solution of hydrosulphite, recovering the more difficultly soluble part of the leuco compounds formed and oxidizing the separated part.

6. A process of producing chloro-anthraquinone-2.1(N)-benzacridones, which comprises treating an 1-anilinoanthraquinone containing a methyl group in ortho position to the nitrogen atom in an inert organic solvent in the absence of acid-binding agents and water with a chlorinating agent until products are produced which contain about six atoms of chlorine when saponified.

7. As new articles of manufacture anthraquinone-2.1(N)-benzacridones containing more than five atoms of chlorine, dissolving in concentrated sulphuric acid with orange to red colorations and giving when treated with diethylaniline products dyeing cotton currant shades.

8. As a new article of manufacture hexachloro-anthraquinone-2.1(N)-benzacridone dissolving in concentrated sulphuric acid with a red coloration, giving when treated with diethylaniline products dyeing cotton currant shades, and dyeing cotton pure red shades from the warm violet vat.

9. A process of producing chloro-anthraquinone-2.1(N)-benzacridones, which comprises treating an 1-anilinoanthraquinone containing a methyl group in ortho position to the nitrogen atom in an inert organic solvent in the absence of acid-binding agents and water with a chlorinating agent until products are produced which contain about six atoms of chlorine when saponified, saponifying the products, treating them with an alkaline solution of hydrosulfite and oxidizing the leuco compound thus prepared.

In testimony whereof I have hereunto set my hand.

WALTER BRUCK.